United States Patent
Suh et al.

(10) Patent No.: US 6,798,915 B2
(45) Date of Patent: Sep. 28, 2004

(54) APPARATUS HAVING LOWER DATA TRANSMISSION RATE AND LESS DEGRADATION OF IMAGE QUALITY AND METHOD THEREFOR

(75) Inventors: Jung-Wook Suh, Seoul (KR); Yong-je Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 684 days.

(21) Appl. No.: 09/771,920

(22) Filed: Jan. 30, 2001

(65) Prior Publication Data

US 2001/0050692 A1 Dec. 13, 2001

(30) Foreign Application Priority Data

Jun. 10, 2000 (KR) ......................................... 2000-31951

(51) Int. Cl.[7] .................................................. G06K 9/36
(52) U.S. Cl. ....................... 382/232; 382/233; 382/248; 382/249
(58) Field of Search ................................ 382/232, 248, 382/249, 233; 380/29, 37; 709/201; 463/30; 345/43, 156, 157, 161

(56) References Cited

U.S. PATENT DOCUMENTS

| | | | |
|---|---|---|---|
| 5,929,898 A | 7/1999 | Tanoi | .......................... 348/15 |
| 6,356,667 B1 * | 3/2002 | Fukuhara | ..................... 382/248 |
| 6,599,194 B1 * | 7/2003 | Smith et al. | ................... 463/30 |

FOREIGN PATENT DOCUMENTS

| | | | | |
|---|---|---|---|---|
| JP | 409055926 | * | 2/1997 | .......... H04N/7/173 |
| JP | 11-146367 | | 5/1999 | ............. H04N/7/14 |
| JP | P2000-165866 A | | 6/2000 | ............. H04N/7/24 |
| JP | P2000-270322 A | | 9/2000 | ............. H04N/7/24 |
| JP | P2001-45476 A | | 2/2001 | ............. H04N/7/24 |

\* cited by examiner

*Primary Examiner*—Anh Hong Do
(74) *Attorney, Agent, or Firm*—Sughrue Mion, PLLC

(57) ABSTRACT

An image display apparatus having a lower data transmission speed and less degradation of the image quality for displaying the image having a lower data-rate according to the state of a communications network and a method for enabling the same are provided. The apparatus, which transmits and receives data by way of the communications network, includes a screen size determiner which determines the screen size of image signals input according to control signals; an encoder which encodes the image signals according to the determined screen size; a controller which outputs control signals which determine the screen size by evaluating the state of the communications network and for transmitting the encoded image signals through the communications network; a decoder which decodes the image signals transmitted through the communications network; and a display which displays the decoded image signals.

16 Claims, 4 Drawing Sheets

APPARATUS HAVING LOWER DATA TRANSMISSION RATE AND LESS DEGRADATION OF IMAGE QUALITY AND METHOD THEREFOR

BACKGROUND OF THE INVENTION

1. Field of the Invention

The present invention relates to an image display apparatus and a method of displaying an image, and more particularly, to an apparatus having a lower data transmission rate and less degradation of the image quality for displaying data with a lower data-rate depending on the state of a communications network and a method therefor. The present application is based on Korean Patent Application No. 00-31951, which is incorporated herein by reference.

2. Description of the Related Art

The next generation mobile communications system, the international mobile telecommunications IMT-2000, can provide image transmission services in addition to voice and text services using commonly used portable personal information terminals. Image transmission of the IMT-2000 includes storing and transmitting still and moving images according to international standards of digital image compression such as H.263 or MPEG4.

When encoding an image by H.263, input image signals formed of frames (progressive images) are inputted to a discrete cosine transform (DCT) treater (not shown), and the DCT treater treats the progressive image with DCT as a divided block unit of 8×8 size, and inputs the DCT coefficient of the frequency region to a quantization device (not shown). The quantization device quantizes and compresses the DCT coefficient according to the quantization interval controlled by the fixed amount of bits per frame. The signals quantized by the quantization device are transmitted through the network, through movement compensation and prediction processes after inverse quantization and inverse discrete transformation.

Such a conventional moving image encoding process enables the state of the communications network to be determined through a real-time transport protocol (RTP) or a real-time control protocol (RTCP). Then, if there is much traffic, the value of the quantization factor is controlled as a result of the rate control in order to decrease the amount of the transmitted bits. By doing this, the image quality is degraded excessively just as the screen size is maintained.

SUMMARY OF THE INVENTION

To solve the above problems, it is an object of the present invention to provide an apparatus with a lower data-rate and less degradation of the image quality by shrinking the screen size and transmitting reduced-size screen data depending on the state of a communications network.

It is another object of the present invention to provide a method for enabling a lower data-rate and less degradation of the image quality by shrinking the screen size and transmitting reduced-size screen data depending on the state of a communications network.

Accordingly, to achieve the above objects, there is provided an apparatus having a lower data-rate and less degradation of the image quality, wherein an apparatus for transmitting and receiving data through a communications network, preferably includes: a screen size determining means for determining the screen size of image signals input according to control signals; an image signal encoding means for encoding the image signals according to the determined screen size; a control means for outputting control signals which determine the screen size by evaluating the state of the communications network and for transmitting the encoded image signals through the communications network; an image signal decoding means for decoding the image signals transmitted through the communications network; and a display means for displaying the decoded image signals.

Further, the apparatus of the present invention having a lower data-rate and less degradation of the image quality, wherein an apparatus for transmitting and receiving data through a communications network, preferably includes: a screen size determining means for determining the screen size of image signals input according to control signals; an encoding means for encoding the image signals according to the determined screen size; a control means for outputting control signals which determine the screen size by evaluating the state of the communications network and for transmitting the encoded image signals through the communications network by setting the bits for determining a prescribed screen size; a decoding means for magnifying and decoding the image signals transmitted through the communications network as the image signals of the initial screen by perceiving the existence of the setting of bits for determining the transmitted screen size; and a display means for displaying the decoded image signals.

To achieve another object of the present invention, there is provided a method for enabling a lower data-rate and less degradation of the image quality, preferably, including: (a) determining the screen size of the image signals input into the communications network; (b) encoding the image signals according to the screen size determined in the step (a), and transmitting the image signals to the communications network; (c) decoding the image signals according to the screen size transmitted through the communications network; and (d) displaying the decoded image signals.

Also, the method for enabling a lower data-rate and less degradation of the image quality includes: (a) determining the screen size of image signals input to the communications network; (b) encoding the image signals according to the screen size determined in the step (a), setting and transmitting the prescribed bits for determining the screen size to the communications network; (c) magnifying and decoding the image signals transmitted through the communications network as the image signals of the initial screen by perceiving the existence of the setting of bits for determining the transmitted screen size; and (d) displaying the decoded image signals.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
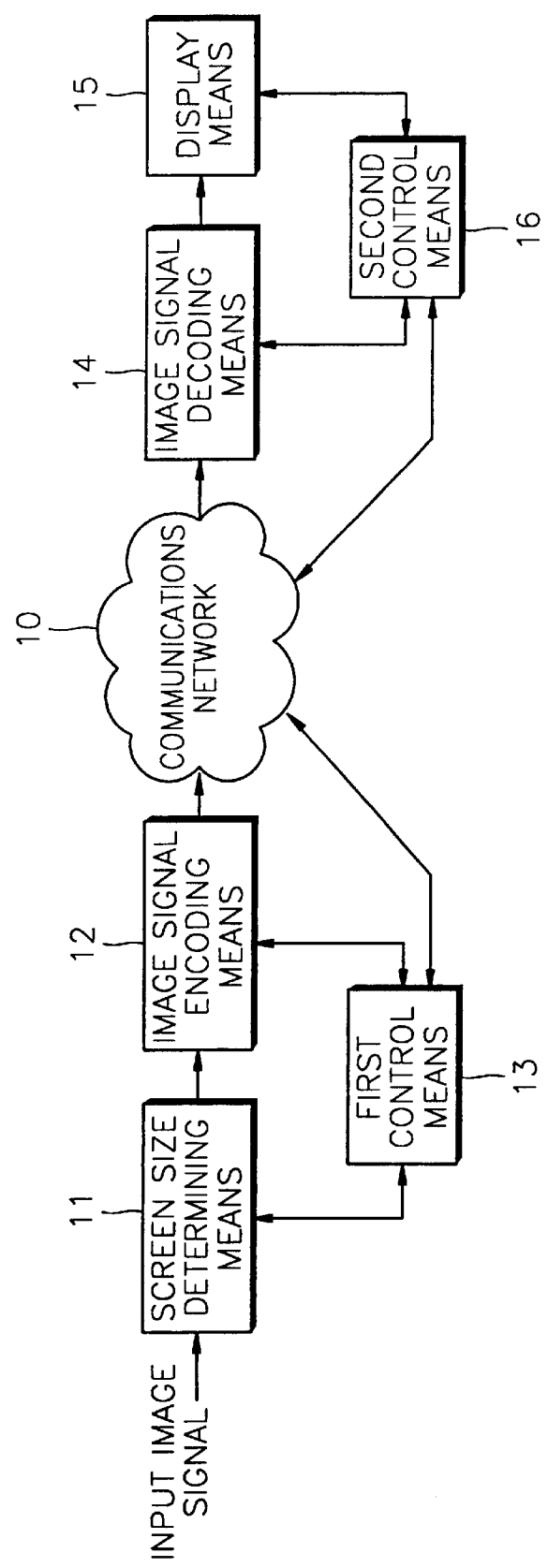
FIG. 1 is a block diagram showing the structure of an apparatus having a lower data-rate and less degradation of the image quality according to the present invention.

FIG. 1 is a block diagram showing the structure of an apparatus having a lower data-rate and less degradation of the image quality.

The apparatus shown in FIG. 1 includes a communications network 10, a screen size determining means 11 for determining the screen size of image signals input according to control signals, an encoding means 12 for encoding the image signals input according to the determined screen size, a first control means 13 for outputting the control signals which determine the screen size by evaluating the state of the communications network 10 and transmitting the encoded image signals through the communications network 10, a decoding means 14 for decoding the image signals transmitted through the communications network 10, a display means 15 for displaying the decoded image signals, and a second control means 16 for controlling the decoding and displaying of transmitted image signals by evaluating the state of the communications network 10.

Figure 2:
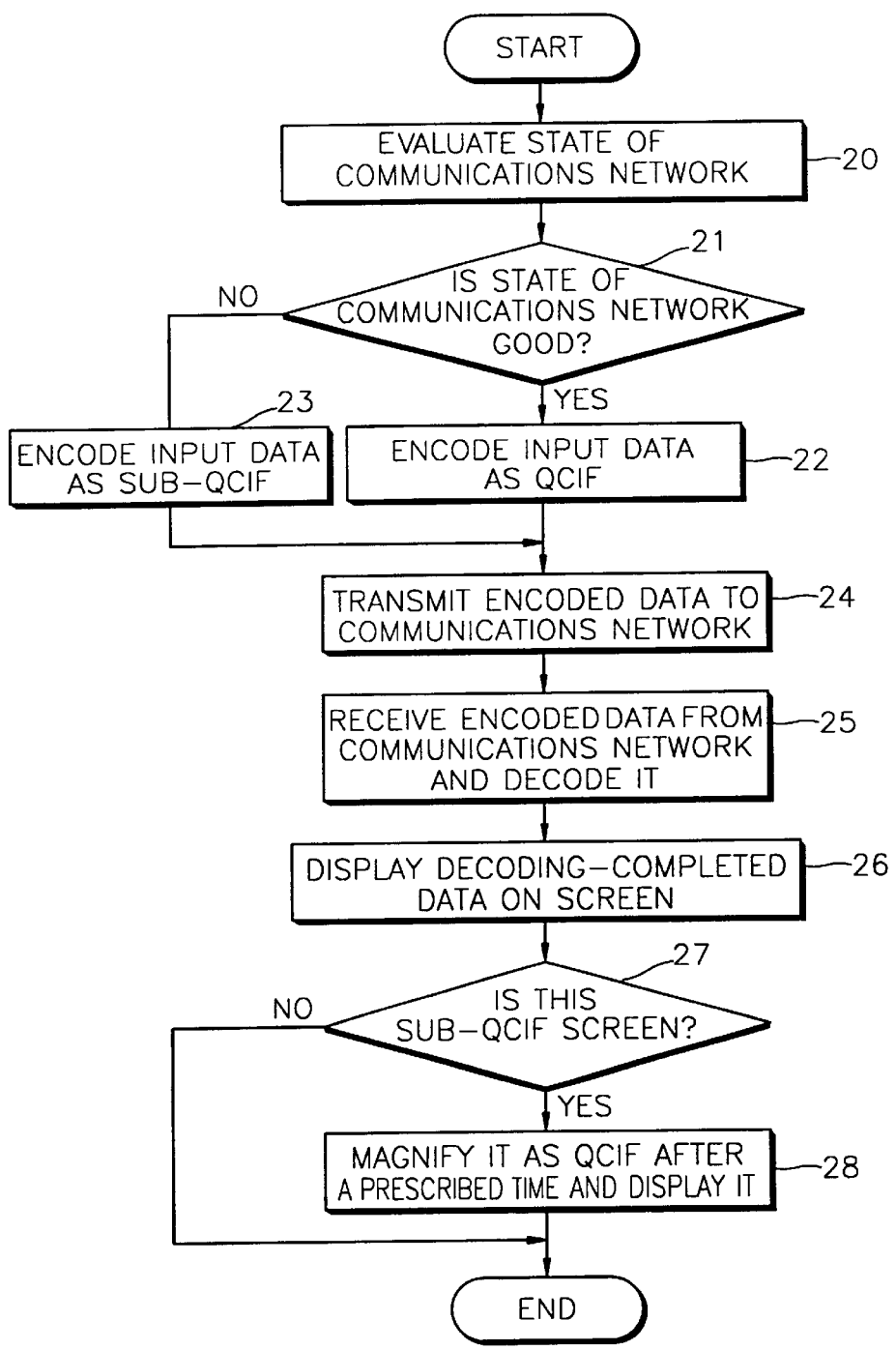
FIG. 2 is a flowchart showing the first preferred embodiment of a method enabling a lower data-rate and less degradation of the image quality according to the present invention.

FIG. 2 is a flowchart showing the first preferred embodiment of a method for enabling a lower data-rate and less degradation of the image quality according to the present invention.

The flowchart shown in FIG. 2 includes a step 20 of evaluating the state of the communications network, a step 21 of determining whether the state of the communications network is good, a step 22 of encoding input data as a quarter common intermediate format (QCIF), a step 23 of encoding the input data as a sub-QCIF, a step 24 of transmitting the encoded data to the communications network, a step 25 of receiving and decoding the encoded data from the communications network, a step 26 of displaying the decoding-completed data on a screen, a step 27 of determining whether the screen is a sub-QCIF screen, and a step 28 of magnifying and displaying the sub-QCIF screen as the QCIF screen after a prescribed time has passed.

The present invention is described in greater detail referring to FIGS. 1 and 2.

The first control means 13 evaluates the state of the communications network 10 and determines whether the state of the communications network is good (steps 20, 21).

The call set up of the image signal encoding means 12 is a quarter common intermediate format (QCIF) as an initial screen. However, the first control means 13 evaluates the state of the communications network 10 with an RTP or an RTCP, and determines whether there is much traffic in the current communications network 10.

The image signal encoding means 12 encodes the input data as QCIF, if there is little traffic as a result of the communications network check by the first control means 13 (step 22).

If there is little traffic as a result of the communications network check of the first control means 13, the result is output as the result of the screen size determining means 11. According to the result of the output, the screen size determining means 11 outputs the screen size as the initial screen in the image signal encoding means 12. The image signal encoding means 12 encodes the image signals, currently input by the output of the screen size determining means 11, as QCIF as the initial screen.

When encoding the image by H.263, the input image signals (progressive image) formed of frames are inputted to a discrete cosine transform (DCT) treater (not shown), and the DCT treater treats the image signals with DCT as a divided block unit of 8×8 and inputs the DCT coefficient to the quantization device (not shown). The quantization device quantizes and compresses the DCT coefficient according to the quantization interval controlled by the fixed amount of bits per frame. The signal quantized by the quantization device outputs image signals encoded through the movement compensation and prediction processes after the inverse quantization and the inverse discrete transformation treatment.

If there is much traffic as a result of the communications network check by the first control means 13, the input data is encoded as sub-QCIF in the image signal encoding means 12 (step 23).

If there is much traffic as a result of the communications network check by the first control means 13, the result is output as the result of the screen size determining means 11. According to the result of the output, the screen size determining means 11 outputs a screen size that is one-fourth the initial screen size in the image signal encoding means 12. The image signal encoding means 12 encodes the image signals currently input by the output of the screen size determining means 11 as sub-QCIF, which is reduced to one-fourth.

Figure 4:
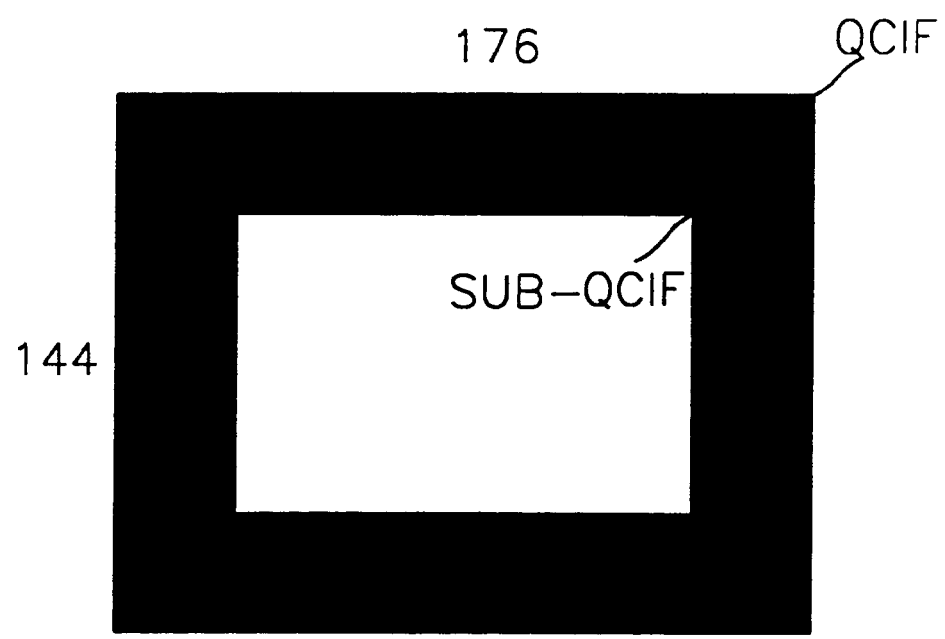
FIG. 4 is a drawing showing a preferred embodiment of a screen having a lower data-rate.

In the sub-QCIF, as shown in FIG. 4, the screen size is reduced to one-fourth the initial screen size. Here, it is not required to predict the DCT or the movement estimation of a black portion and the macro block is skipped and encoded in the image signal encoding means 12. Therefore, the number of bits is decreased by as much as the black portion.

As a method of lowering the incidence of the extra bits, a black-and-white mode using only a brightness signal among the image signals can be performed. The color signals are formed of Y, Cr, and Cb. If there is much traffic in the communications network 10, the Cr and Cb signals among the color signals are not encoded, and the black-and-white mode using only the Y signal is performed to decrease the data-rate.

The image signals encoded as QCIF or sub-QCIF by the image signal encoding means 12 are transmitted to the communications network (step 24).

The second control means 16 perceives the reception of the encoded image signals, and the image signal decoding means 14 receives and decodes the encoded image signals transmitted from the communications network 10 (step 25).

The image signals of which the decoding is completed by the image signal decoding means 14 are displayed in the display means 15 (step 26).

Here, it is determined whether the screen displayed in the display means 15 is a sub-QCIF screen (step 27). If the screen displayed in the display means 15 is QCIF, the screen is displayed as the initial screen.

If the screen displayed in the display means 15 is sub-QCIF, the screen is magnified and displayed as a QCIF screen after a prescribed time has passed (step 28).

If the screen displayed in the display means 15 is sub-QCIF, the second image signal control means 16 perceives that there are black borders on the display screen. The decoding means 14 decodes the screen as sub-QCIF and outputs the decoded data in the display means 15, and if the black borders are continuously perceived for a prescribed time, the sub-QCIF portion is magnified as QCIF and outputs the screen in the display means 15. Since the display means 15 displays the magnified sub-QCIF, degradation of the image quality is decreased, so that it becomes possible to view quality images on the screen. If the image signal decoding means 14 does not have this kind of function, the QCIF is displayed as sub-QCIF with the black borders as it is.

Figure 3:
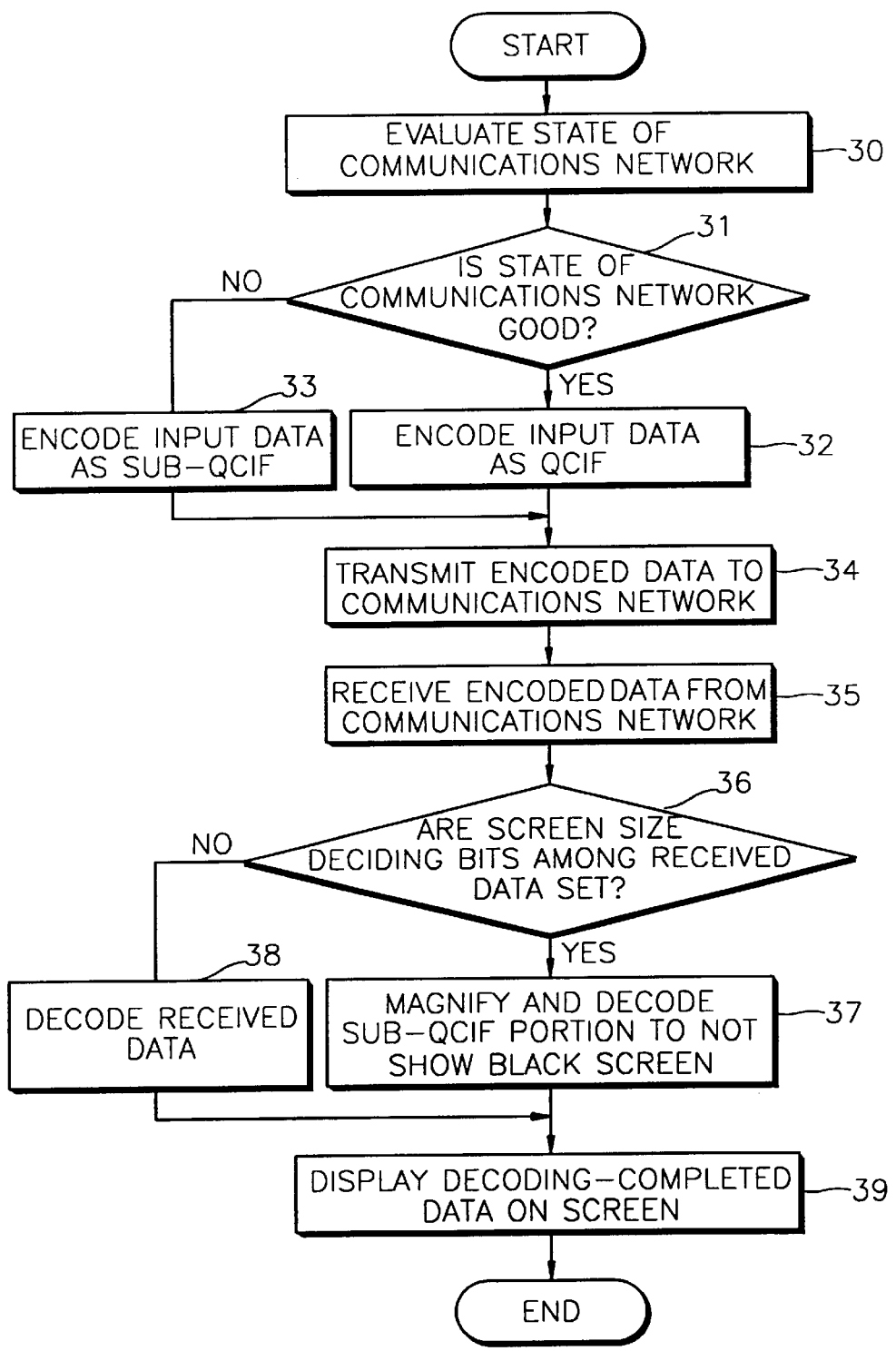
FIG. 3 is a flowchart showing the second preferred embodiment of a method enabling a lower data-rate and less degradation of the image quality according to the present invention.

FIG. 3 is a flowchart showing the second preferred embodiment of the method with a lower data-rate and less degradation of the image quality according to the present invention.

The flowchart shown in FIG. 3 includes a step (30) of evaluating the state of the communications network, a step (31) of determining whether the state of the communication network is good, a step (32) of encoding the input data as QCIF, a step (33) of encoding the input data as sub-QCIF, a step (34) of transmitting the encoded data to the communications network, a step (35) of receiving the encoded data from the communications network, a step (36) of determining whether the screen size determining bits are set among the received data, a step (37) of magnifying and decoding the sub-QCIF portion to not show a black screen, a step (38) of decoding the received data, and a step (39) of displaying the decoding-completed data on the screen.

Below, the present invention will be described in detail with reference to FIGS. 1 and 3.

The first control means 13 determines whether the communications network is good by evaluating the state of the communications network 10 (steps 30, 31).

The image signal encoding means 12 encodes the input data as QCIF, if there is little traffic as a result of the communications network check by the first control means (step 32).

If there is much traffic as a result of the communications network check by the first control means 13, the input data is encoded as sub-QCIF in the image signal encoding means 12 (step 33).

As shown in FIG. 4, the screen size is reduced to one-fourth the initial size in the sub-QCIF state, where the dimensions of the QCIF screen are 144 pixels vertically and 176 pixels horizontally. In the image signal encoding means 12, it is not required to predict the DCT or the movement estimation of the black portion, and the macro block is skipped and encoded. Therefore, the number of bits is decreased by as much as the black portion.

As a method for decreasing the incidence of the additional bits, the black-and-white mode using only the brightness signal among the image signals can be performed. The color signals are formed of Y, Cr, Cb. If there is much traffic in the communications network 10, the Cr and Cb signals among the color signals are not encoded, and the black-and-white mode using only the Y signal is performed to decrease the data-rate.

The image signals encoded as the QCIF or sub-QCIF by the image signal encoding means 12 are transmitted to the communications network (step 34). When transmitting the image signals to the communications network 10, an indication that the screen is encoded as sub-QCIF in the image signal encoding means 12 is transmitted, together with the image signals, to the communications network, using extra bits which are not used in standards like H.263.

The second control means 16 perceives the reception of the encoded image signals transmitted from the communications network 10, and determines whether the extra bits are set and the image signals are the image signals encoded as sub-QCIF (steps 35, 36).

If the extra bits are set as a result of determination of the second control means 16, the image signal decoding means 14 magnifies and decodes the sub-QCIF portion as the QCIF to not show the black screen (step 37).

If the extra bits are not set as a result of the determination of the second control means 16, the image signal decoding means 14 decodes the received data as it is (step 38).

When the decoding of the image signal is completed, it is displayed in the display means (step 39). If the extra bits are set, the display means 15 displays the magnified sub QCIF, so that degradation of the image quality is decreased to enable quality images to be viewed on the screen.

According to the present invention, when the data-rate must be decreased due to the state of the network being poor, the data-rate is decreased by reducing the screen size to one-fourth its initial size and transmitting the reduced screen size data without controlling only the value of the quantization coefficient. In the decoder, the screen reduced in size is magnified and scattered as the initial size on the screen, so that the screen size is maintained and the degradation of the image quality can be decreased.

This invention has been particularly described with reference to preferred embodiments thereof, however; it is not limited to the preferred embodiments and various changes may be made by the those skilled in the art without departing from the spirit and scope of the invention as defined by the appended claims.

What is claimed is:

1. An apparatus having a lower data-rate for transmitting and receiving data by way of a communications network, comprising:

a screen size determining means for determining a screen size of image signals input according to control signals;

an encoding means for encoding the image signals according to the determined screen size;

a control means for outputting the control signals which determine the screen size by evaluating a state of the communications network, and transmitting the encoded image signals through the communications network;

a decoding means for decoding the image signals transmitted through the communications network; and a display means for displaying the decoded image signals.

2. The apparatus of claim 1, wherein the control means outputs the control signals for determining a screen which is reduced in size by a prescribed multiple with respect to an initial screen size if the state of the communications network is not good.

3. The apparatus of claim 1, wherein the encoding means does not encode image signals of the screen reduced in size during the encoding.

4. The apparatus of claim 1, wherein the encoding means performs encoding in a black-and-white mode in which only a brightness signal among the image signals is encoded according to the state of the communications network.

5. The apparatus of claim 1, wherein the decoding means magnifies the image signals of the screen reduced in size during the decoding after a prescribed time has passed, and outputs the magnified image signals to the display means.

6. An apparatus having a lower data-rate for transmitting and receiving data by way of a communications network, comprising:

a screen size determining means for determining a screen size of image signals input according to control signals;

an encoding means for encoding the image signals according to the determined screen size;

a control means for outputting the control signals which determine the screen size by evaluating a state of the communications network, and transmitting the encoded image signals through the communications network by setting prescribed screen size deciding bits;

a decoding means for perceiving the existence of the setting of the prescribed screen size deciding bits, and magnifying and decoding the image signals, transmitted through the communications network, as the image signals of an initial screen; and a display means for displaying the decoded image signals.

7. The apparatus of claim 6, wherein the encoding means does not encode the image signals of the screen reduced in size during the encoding.

8. The apparatus of claim 6, wherein the encoding means performs encoding in a black-and-white mode in which only a brightness signal among the image signals is encoded according to the state of the communications network.

9. A method for enabling a lower data-rate, comprising the steps of:

(a) determining a screen size of image signals input into a communications network;

(b) encoding the image signals according to the determined screen size, and transmitting the encoded image signals to the communications network;

(c) decoding the image signals transmitted through the communications network according to the screen size; and (d) displaying the decoded image signals;

wherein the screen size is determined to be reduced in size by a prescribed multiple with respect to an initial screen size, if a state of the communications network is not good, and the screen size is determined to be the initial screen size, if the state of the communications network is good, in the step (a) of determining the screen size.

10. A method for enabling a lower data-rate, comprising the steps of:

(a) determining a screen size of image signals input into a communications network;

(b) encoding the image signals according to the determined screen size, and transmitting the encoded image signals to the communications network;

(c) decoding the image signals transmitted through the communications network according to the screen size; and (d) displaying the decoded image signals;

wherein the image signals of the screen reduced in size during encoding in the step (b), are not encoded.

11. A method for enabling a lower data-rate, comprising the steps of:

(a) determining a screen size of image signals input into a communications network;

(b) encoding the image signals according to the determined screen size, and transmitting the encoded image signals to the communications network;

(c) decoding the image signals transmitted through the communications network according to the screen size; and (d) displaying the decoded image signals;

wherein the encoding of the step (b) performs encoding in a black-and-white mode in which only a brightness signal among the image signals is encoded according to the state of the communications network.

12. A method for enabling a lower data-rate, comprising the steps of:

(a) determining a screen size of image signals input into a communications network;

(b) encoding the image signals according to the determined screen size, and transmitting the encoded image signals to the communications network;

(c) decoding the image signals transmitted through the communications network according to the screen size; and (d) displaying the decoded image signals;

wherein the image signals of the screen reduced in size during the decoding of the step (c) are magnified after a prescribed time has passed, and decoded.

13. A method for enabling a lower data-rate, comprising the steps of:

(a) determining a screen size of image signals input into a communications network;

(b) encoding the image signals according to the determined screen size, and transmitting the encoded image signals to the communications network by setting prescribed screen size deciding bits;

(c) magnifying and decoding the image signals transmitted through the communications network as the image signals of the initial screen by evaluating the existence of the setting of the prescribed screen size deciding bits; and (d) displaying the decoded image signals.

14. The method of claim 13, wherein the image signals of the screen reduced in size during the encoding of the step (b) are not encoded.

15. The method of claim 14, wherein the step (b) performs encoding in a black-and-white mode in which only a brightness signal among the image signals is encoded according to a state of the communications network.

16. A method for enabling a lower data-rate, comprising the steps of:

(a) determining a screen size of image signals input into a communications network, based on a state of the communications network;

(b) encoding the image signals according to the determined screen size, and transmitting the encoded image signals to the communications network;

(c) decoding the image signals transmitted through the communications network according to the screen size; and (d) displaying the decoded image signals.

* * * * *